March 23, 1937. G. W. ENGSTROM 2,074,685
SUBSTITUTE FRONT TRUCK FOR TRACTORS
Filed Feb. 11, 1935 4 Sheets-Sheet 1

Inventor
Gustaf W. Engstrom

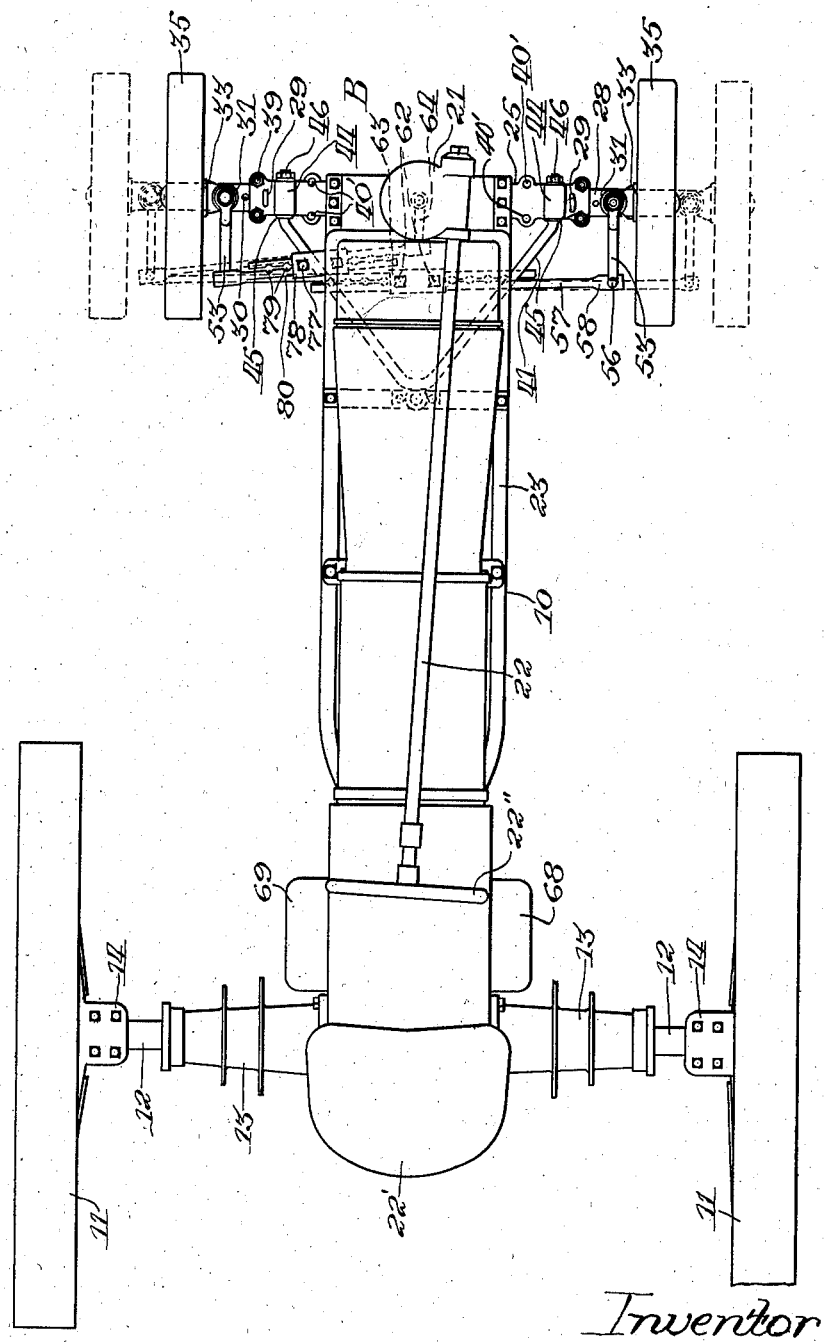

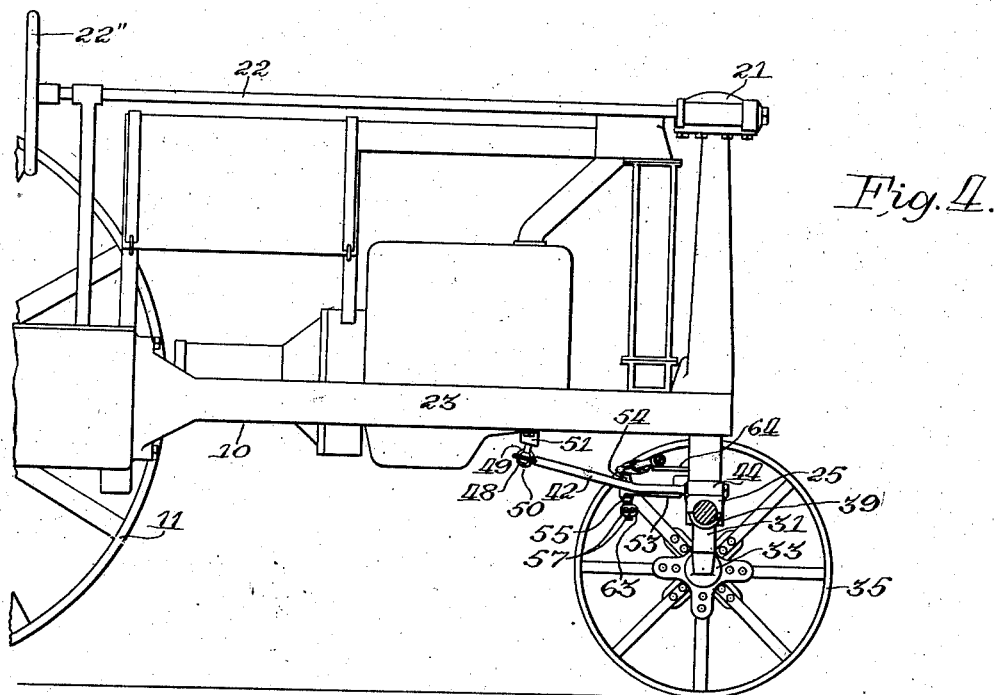
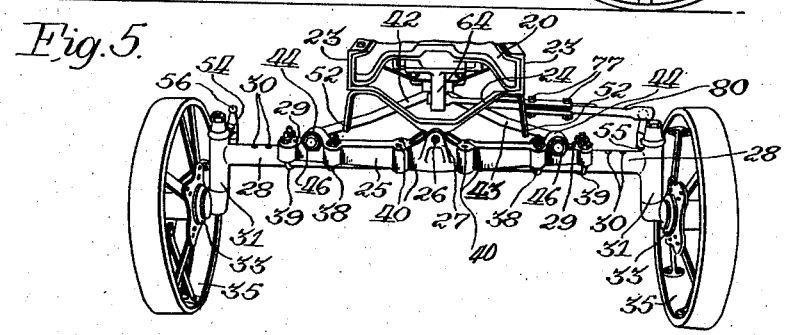
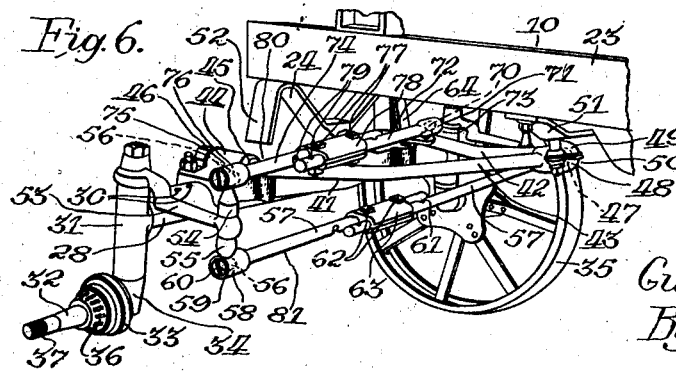
Inventor
Gustaf W. Engstrom

Patented Mar. 23, 1937

2,074,685

UNITED STATES PATENT OFFICE 2,074,685

SUBSTITUTE FRONT TRUCK FOR TRACTORS

Gustaf W. Engstrom, Riverside, Ill., assignor to International Harvester Company, a corporation of New Jersey Application February 11, 1935, Serial No. 5,975

13 Claims. (Cl. 180—1)

This invention relates to tractor operated tillage implements in which the tractor of a well known, tri-cycle type is modified into a wide tread front axle type.

The main object of the invention is to provide a tractor attachment to replace the usual steering truck of the tri-cycle type of tractor as disclosed in the patent to E. A. Johnston 2,031,317 granted February 18, 1936, the attachment having an adjustable front axle for mounting the tractor guide wheels so that it may span a plurality of plant rows which are in the process of cultivation and which have been planted at a definite spacing. The attachment comprises telescoping axle extensions that may be adjusted to retain the wheels at a certain spaced distance to run in between the rows, as is determined by the spacing of the plant rows in which the tractor is operated, so that the plants may be properly cultivated without damage being done by the wheels of said attachment.

Another object of the invention is to adapt this adjustable front axle attachment to the tri-cycle type of tractor, having the rear wheels adjustable on the rear axle for various row crop spacings.

Still another object is to so manufacture this attachment that it may be attached to the tractor in the regular production line or so that it may replace the tri-cycle type front truck as a field change for the regular tri-cycle type tractor already in use in the field.

It is a further object of the invention to provide improved details of structure whereby the telescoping parts may be made of substantial size and rigidity with as little weight as possible and whereby the parts may be joined together and fixed to the tractor frame to form a pivoted support for the latter.

In accomplishing the foregoing objects and other minor objects, which will hereinafter be more specifically described and then defined in the claims, the preferred forms of the improved details of structure are illustrated in the accompanying drawings, wherein:

Figure 3 is a plan view of a tractor equipped with the attachment adjusted in its extreme positions;

Figure 4 is a side elevation of a tractor with the right front wheel of the tractor attachment removed to show the invention in place;

Figure 5 is a part perspective view of the invention;

Figure 6 is a perspective view of the invention in place with the left wheel removed to better show details of the construction.

Figure 1:
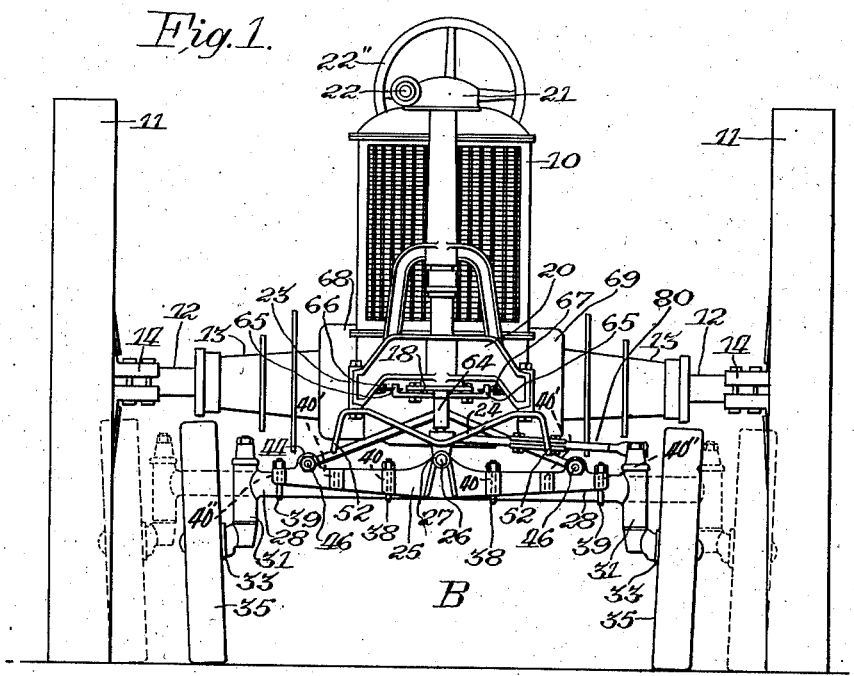
Figure 1 is a front end view of a tractor equipped with the adjustable wide tread axle of the present invention showing it adjusted in its extreme positions.

The invention is herein disclosed in combination with a tractor 10 of the wide tread type having rear wheels 11 adjustably mounted for various row spacings on the rear axles 12 rotatably supported in the rear axle housing 13. The wheels 11 may be reversed in their position from that shown, with the hub clamps 14 on the outside, giving additional variations in row spacing.

Figure 2:
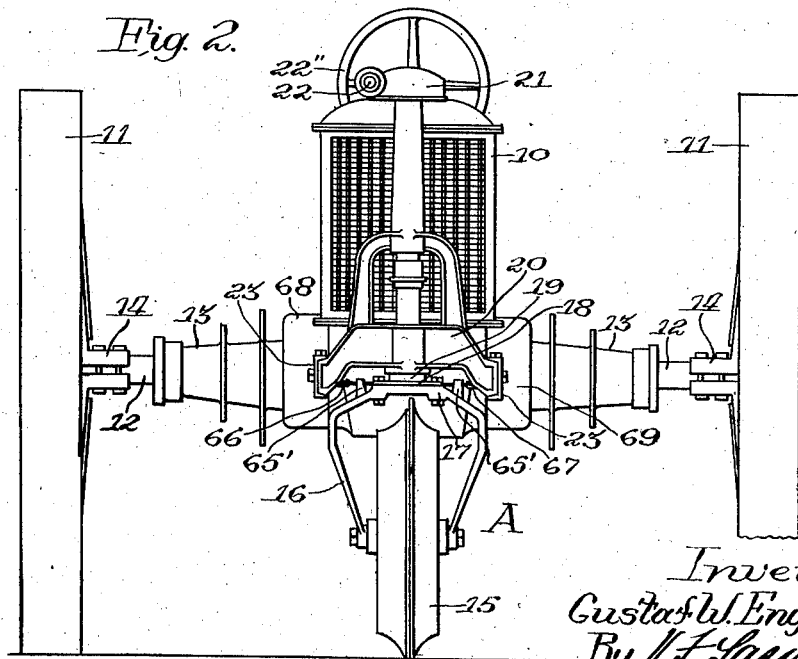
Figure 2 is a front end view of a tractor equipped with the tri-cycle type of steering truck before it has been converted into the wide tread front axle type, as shown in Figure 1.

Figure 2 shows the usual tri-cycle type tractor 10 having the forward steering truck A, comprising the front wheel 15 rotatably secured to the front bolster fork 16, which is securely connected at its upper part 17 to the lower end 18 which is formed as an attaching bracket on the bolster shaft 19 pivoted in the front bolster housing 20. The bolster shaft 19 at its upper end is connected by the usual worm and gearing concealed in the housing 21, with the worm connected to the steering shaft 22 extending to the operator's station 22'. The steering truck A is operated from the operator's station 22' by the steering wheel 22'', through the mechanism previously described.

It has been found, in the cultivation of various row crops, especially of the garden truck variety where the rows are closely spaced, that the tri-cycle type of tractor is not entirely satisfactory and that, in certain conditions, a wide tread type of front steering truck has become necessary with the additional features of adjustability for the various widths of spacing required for different row crops. In order to accomplish this object, the wide tread adjustable front steering truck B, best shown in Figure 3, has been invented to replace the usual steering truck A, as shown in Figure 2.

The wide tread attachment B is supported from the side channel frames 23 of the tractor 10 by means of the front end support 24 secured to the lower leg of the side channel frames. The front end support 24 is pivotally connected to the front axle telescoping housing 25 by the front axle pivot pin 26 through the support 24 and the bracket 27 integral with the front axle housing 25. Adjustably positioned in the axle housing 25 are the front axle extensions 28, held in adjusted position by the dowel pins 29, which extend a short distance into the adjusting holes 30 in the axle extension 28. The holes 30 are spaced to permit each axle extension 28 to have an adjusting range of ten inches at two inch intervals. The center line of the wheel tread may be adjusted from a minimum spacing of forty-four inches to a maximum spacing of sixty-four inches at two inch intervals, and the necessary adjustments may be made by adjusting either axle extension, or both, simultaneously. It is to be understood that other ranges of wheel spacings may be used. Forged from the axle extensions 28 at the outer ends thereof is a downwardly extending L-shaped bearing 31, in which the L-shaped steering knuckle and wheel support 32 is pivoted. On the outer portion of the steering knuckle and wheel support 32 is positioned a dust shield 33 and the steering knuckle collar 34. The wheels 35 are carried by the tapered roller bearings 36, the inner one being shown in Figure 6. The wheels 35 are securely fastened in place by suitable fastening means on the threaded end 37 of the steering knuckle 32. The axle extensions 28 are clamped into adjusted position by means of the inner and outer U-shaped clamps 38 and 39 symmetrically placed on each side of the front axle housing 25 in the holes 40. There are three sets of holes 40, 40', and 40" namely the inner set 40, the middle set 40', and the outer set 40", in the axle housing 25 on each side. The clamps 38 and 39 are placed in the innermost and outermost set of holes 40 and 40" of the axle housing 25 when the axle extensions are set at the minimum spacing, as shown in Figure 1, and in the middle and outer set of holes 40' and 40" at the maximum spacing, as shown in Figure 5, or the clamps 38 and 39 may remain in the middle or outer sets of holes 40' and 40" when the axle extensions are set at either maximum or minimum spacing.

In order to thoroughly brace the front axle housing 25, a stay rod 41 in the shape of a wishbone, having legs 42 and 43, is secured by the ends of the legs 42 and 43 positioned in brackets 44 integral with the axle housing 25. The stay rod is securely held in place by the collars 45 integral on the legs 42 and 43 of the stay rod 41 and the nuts 46 threaded on the ends of the legs 42 and 43. The legs 42 and 43 are converged together and bent upwardly, forming the apex of a V, to which is forged a ball 47 positioned in a socket formed by the cap 48 and base 49 to form the ball and socket joint 50. The cap and base 48 and 49 are secured to the stay rod ball and socket bracket 51. The bracket 51 is secured on each end to the side frames 23 of the tractor. By the construction just described, the front axle 25 may oscillate in a vertical plane about the pivot pin 26 and the ball and socket joint 50 as an axis. The axle 25 is limited in its vertical movements by downwardly extending stops 52 integral with the front end support 24.

In order to steer the front wheels 35, steering knuckle arms 53, securely fastened to the steering knuckles 32 and extending rearwardly therefrom, have T-shaped extensions forged thereon, forming upwardly and downwardly extending parts 54 and 55, respectively. The extensions 54 and 55, respectively, have forged thereon the balls 56 to form with a corresponding socket a ball and socket joint. The steering knuckle arms 53 are held in their respective positions by the steering connection adjusting rods 57 formed at their outer ends with sockets 58, forming with the balls 56 ball and socket joints 59. The sockets 58 have the usual adjusting means 60 to assemble and secure the ball 56 in the socket 58. When the axle extensions 28 are extended, the adjusting rods 57 are adjusted by the notches 61 on each adjusting rod 57, which are aligned, and the bolts 62 are passed through the adjusting rod clamp 63 and between the aligned notches 61, which act as a lock for the adjusting rods. The bolts are securely fastened to prevent the clamp 63 from shifting. Attached to the bolster shaft 19 on the attaching bracket 18 is the steering gear arm 64, extending downwardly and rearwardly. Secured to the steering gear arm 64 and extending laterally therefrom are the lugs 65, which are similar to the lugs 65' shown in Figure 2, which, when the steering truck A is turned to the right or left a certain distance, contact the mechanism 66 and 67 as disclosed in the patent to E. A. Johnston, 2,031,317, granted February 18, 1936, operating the brakes located within the drums 68 and 69, shown in Figures 1 and 2, so that the tractor may make very short right and left hand turns when necessary, by braking the rear wheel about which the tractor is turning. The same results may be accomplished by the attachment B shown in Figure 1, when the wheels 35 are turned. Extending upwardly from the steering gear arm 64 on the rear end thereof is the ball 70, forming with the socket 71, forged on the inner adjustable drag-link 72, a ball and socket joint 73. An outer adjustable drag-link 74 is pivoted to the upwardly extending portion 54 of the steering knuckle arm 53 by the ball and socket joint 75 formed by the ball 56 and the socket 76 forged on the drag-link 74. The drag-links 72 and 74 are adjustably connected by the bolts 77 passed through and secured thereto to the drag-link clamp 78 and engaging the notches 79, when aligned for the bolts 77 to pass therebetween. The drag-links 72 and 74 must be adjusted for each position of the front axles when adjusted laterally. It is to be understood that the drag-links 72 and 74 may be connected to the right hand steering knuckle arm 53, as well as to the left hand arm 53, as shown in the illustrations.

It is thus seen that an attachment has been made which is adjustable for various spacings of wheel treads, that is sturdily constructed and very simple to change over from the steering truck of the tri-cycle type, as shown in Figure 2, to the wide tread type shown in Figure 1,—whichever is needed for the conditions in which the tractor is used.

The wide tread axle attachment which is the subject of my invention comprises the front end support 24 to which is pivoted the front telescoping axle structure along with its stay rod 41 and its attaching part 51 which is secured to the tractor. The drag link 74 which steers the front wheels is connected to the front end bolster bracket 18 to which the steering yoke 16 of the tricycle steering struck A is normally attached. The tricycle steering truck A comprising a yoke 16 and its attached wheel 15 is detached from the bracket 18 secured to the bolster shaft 19 and the wide axle attachment which has been previously described is then attached to the tractor. The bracket 64 of the wide tread axle attachment carrying the drag link 74 is secured to the bracket 18 to which the yoke 16 of the tricycle steering truck is normally attached.

In the operation of the wide tread front axle attachment, the operator steers the tractor from the operator's station 22'. The motion given the steering wheel 22" by the operator is transmitted by the steering shaft 22 to the bolster shaft 19 and then to the steering gear arm 64, which in turn operates the steering knuckle 53 through the adjustable drag-link 80, made up of the drag-links 72 and 74. The same motion given to one of the wheels 35 by the steering knuckle 53 is transmitted, by the other wheel 35 through the tie rod 81 formed from the adjusting rods 57, to the other steering knuckle 53. When a very short turn to the right or left is required, the lugs 65 operate mechanism through levers 66 and 67, which operates the brakes 82 and 83 to cause a short right or left hand turn to be made about the respective right or left rear wheel.

Figure 7:
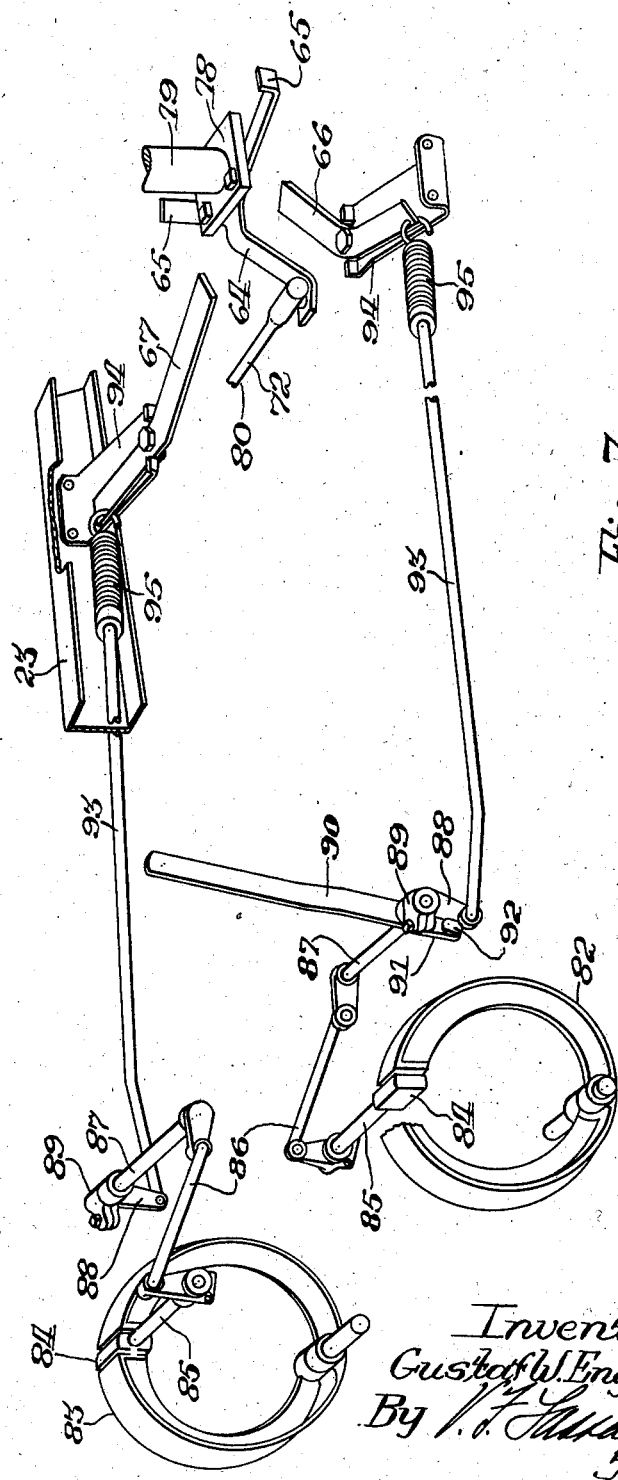
Figure 7 is a perspective view of the brake applying mechanism shown apart from the tractor body.

As best shown in Figures 3 and 7, the cap housings 68 which are suitably secured to the transmission casing of the tractor completely cover and seal the brake drums and exclude dust, water, and dirt from the brakes and casing. The brake shoes 82 and 83 are expanded by cams 84 on rockshafts 85 journaled in the transmission housing of the tractor. The rockshafts 85 are connected by links 86 with parallel rockshafts 87 located forwardly of the rockshafts 85, as disclosed in the patent to Johnston 2,031,317 above referred to. The outer ends of the shafts 87 project outside sufficiently to permit depending crank arms 88 to be clamped on the ends as by split clamp sleeves 89, and allow space between the sleeves 89 and the casing wall for mounting a hand lever 90 rotatable on the shaft. This hand lever is an auxiliary means for applying the brake at that side and in the present instance only one of the brake shafts 87 is shown so equipped though both may be. This lever is provided with an arm 91 extending below its pivot on the shaft 87, which arm has a lateral lug 92 positioned to contact with the rear edge of the crank arm 88 forming a lost motion connection therewith. With this arrangement the hand lever 90 can be used to rock the shaft 87 to apply the brake, but the arm 88 may be rocked forwardly independently of the hand lever.

The brake mechanism of the tractor is primarily under control of the steering mechanism for making short turns; and to effect this, each crank arm 88 is connected to a brake rod 93 extending forwardly through a suitable opening in the outwardly bowed rear portion of each channel member 23 and along the inner sides of those members. As best seen on Figure 8, the forward ends of the side sills or channel members 23 just back of the front bolster 20, have inwardly extending bracket arms 94 secured thereto on which the horizontal angular levers 66 and 67 are pivoted intermediate their ends with the inner arms thereof within the range of the angular movement of the steering truck 16 when the tricycle type, as shown in Figure 2, is used, or within the range of movement of the lugs 65 attached to the steering gear arms 64 when the substitute front truck, as shown in Figure 1, which is the main object of our invention, is used. The forward ends of the brake rods 93 carry coil springs 95 connected to the outer arms of the levers 66 and 67. As previously described, the steering gear arm 64 carries laterally extending lugs 65 which are so positioned as to engage the inner ends of the levers 66 and 67 alternately after predetermined steering angular movement of the bolster shaft 19 in each direction, thus forming a lost motion connection. When this contact or engagement occurs, either one of the levers 66 or 67 will be swung on its pivots and one of the springs 95 put under tension, thereby exerting a pull on one of the brake rods 93 and causing application of the brake on the side toward which the turn is being made. The braking force supplied will, of course, retard or stop rotation of the associated axle shaft and cause the tractor to pivot about the traction wheel on that shaft. It is, therefore, evident that the mechanism just described forms the activating means for the brakes 82 and 83.

It will be evident that there has been provided an attachment which may be readily connected to and disconnected from the tractor and the steering mechanism thereof, and that said attachment affords an organization particularly well adapted for multi-row cultivation, where the rows are spaced close together.

It is to be understood that materials suitable for the stresses encountered in an attachment of this nature are to be used. The preferred embodiment of the invention herein described is capable of certain modifications without departure from the scope of the invention to be defined in the following claims.

What is claimed is:

1. The combination with a tractor having a frame and a vertical bolster shaft for steering said tractor, of a wide axle type steering truck comprising means for securing said steering truck to said tractor frame, a telescoping axle having steering knuckles pivotally mounted thereon, wheels rotatably attached to said steering knuckles, the aforesaid axle pivotally connected to said securing means for allowing said axle to oscillate in a vertical plane, means for adjusting said telescoping axle for a plurality of wheel spacings, tie rod means for aligning said wheels, and means connecting said vertical bolster shaft on said tractor to one of the aforesaid steering knuckles for steering said tractor.

2. The combination with a tractor of the tricycle type having a frame and control means for steering said tractor comprising a steering wheel and shaft operably connected to a vertical steering shaft with bracket means for mounting a steering truck thereon, of a wide axle type steering truck comprising means for securing said wide axle type steering truck to said tractor frame, a telescoping axle having steering knuckles pivotally mounted thereon, wheels rotatably attached to said steering knuckles, the aforesaid axle pivotally connected to said securing means for allowing said axle to oscillate in a vertical plane, means for adjusting said telescoping axle for a plurality of wheel spacings, tie rod means for aligning said wheels, and means connecting the bracket means on said vertical steering shaft on said tractor to one of the aforesaid steering knuckles for steering said tractor.

3. The combination with a tractor having a frame and a vertical bolster shaft for steering said tractor, of a wide axle type steering truck comprising means for securing said steering truck to said tractor frame having a forward and rear supporting bracket secured to said tractor frame, an axle having steering knuckles pivotally mounted thereon, wheels rotatably attached to said steering knuckles, the aforesaid axle pivotally connected to said forward supporting bracket for allowing said axle to oscillate in a vertical plane, means secured to said axle and pivoted to said rear supporting bracket for bracing said axle and permitting it to oscillate, tie rod means for aligning said wheels, and means connecting said vertical bolster shaft on said tractor to one of the aforesaid steering knuckles for steering said tractor.

4. The combination with a tractor having a frame and a vertical bolster shaft for steering said tractor, of a wide axle type steering truck comprising means for securing said steering truck to said tractor frame, a telescoping axle comprising a central housing, axle extensions slidably mounted therein, means for laterally adjusting said axle extensions by predetermined amounts, and means for securing said axle extensions to said central housing; means attached to said central housing for pivoting said central housing to said securing means, steering knuckles pivoted to said axle extensions and having wheels rotatably attached to said steering knuckles, adjustable tie rod means for adjusting and aligning said wheels when said axle is adjusted, and adjustable means connecting said vertical bolster shaft on said tractor to one of the aforesaid steering knuckles for steering said tractor.

5. The combination with a tractor having a wheeled frame and brakes with their activating means, a vertical bolster shaft for steering said tractor, of a wide axle type steering truck comprising means for securing said steering truck to said tractor frame, a telescoping axle having steering knuckles pivotally mounted thereon, wheels rotatably attached to said steering knuckles, the aforesaid axle pivotally connected to said securing means for allowing said axle to oscillate in a vertical plane, means for adjusting said telescoping axle for a plurality of wheel spacings, tie rod means for aligning said wheels, means connecting said vertical bolster shaft on said tractor to one of the aforesaid steering knuckles for steering said tractor, and means on said connecting means for actuating said tractor brakes whereby said tractor will make a short turn to the right or left in any of the adjusted positions of the steering wheels.

6. The combination with a tractor having a frame and control means for steering said tractor, of a wide axle type truck comprising means for securing said steering truck to said tractor frame, a telescoping axle, steering knuckles pivotally mounted on said axle, wheels rotatably attached to said steering knuckles, means mounted on said steering knuckles to provide upper and lower pivotal joints, an adjustable tie rod connecting said lower joint means on the aforesaid steering knuckles comprising adjustable rods with means for adjusting said rods and joint means thereon whereby a flexible joint is made with the aforesaid joint means on said steering knuckles, means for connecting said steering control means on said tractor to one of the aforesaid upper joint means on either of said steering knuckles comprising a rearwardly connecting arm with joint means thereon, adjustable drag-links having means for adjusting said drag-links and joint means thereon whereby a flexibly jointed connection is made from said steering means on said tractor to one of said steering knuckles.

7. The combination with a tractor having a frame and a vertical bolster shaft for steering said tractor, of a wide axle type steering truck comprising means for securing said steering truck to said tractor frame, an axle having steering knuckles pivotally mounted thereon and wheels rotatably attached to said steering knuckles, the aforesaid axle pivotally connected to said securing means for allowing said axle to oscillate in a vertical plane, means for limiting the amount of vertical oscillation of said axle, tie rod means for aligning said wheels, and means connecting said vertical bolster shaft on said tractor to one of the aforesaid steering knuckles for steering said tractor.

8. The combination with a tractor having a frame and a vertical bolster shaft for steering said tractor, of a wide axle type steering truck comprising means for securing said steering truck to said tractor frame, an axle having steering knuckles pivotally mounted thereon and wheels rotatably attached to said steering knuckles, the aforesaid axle pivotally connected to said securing means for allowing said axle to oscillate in a vertical plane, means for limiting the amount of vertical oscillation of said axle attached to said securing means, tie rod means for aligning said wheels, and means connecting said vertical bolster shaft on said tractor to one of the aforesaid steering knuckles for steering said tractor.

9. A wide tread steering truck attachment for a tractor of the tri-cycle type, said tractor having a frame, driving wheels therefor and a vertical bolster shaft, said vertical bolster shaft having attaching means to which a tri-cycle type steering truck may be attached, the aforesaid steering truck attachment comprising means for securing said wide tread steering truck to said tractor frame, an axle having steering knuckles pivotally mounted thereon, wheels rotatably attached to said steering knuckles, said axle pivotally connected to said securing means allowing said axle to oscillate in a vertical plane, tie rod means for aligning said wheels, and means connecting the aforesaid attaching means for a tri-cycle type steering truck on said vertical bolster shaft of said tractor to one of the aforesaid steering knuckles for steering said tractor.

10. A wide tread steering truck attachment for a tractor of the tri-cycle type, said tractor having a frame and steering control means, said steering control means having attaching means to which a tri-cycle type steering truck may be attached, the aforesaid steering truck attachment comprising means for securing said wide tread steering truck to said tractor frame, said securing means having a forward and rear supporting bracket secured to said tractor frame, an axle having steering knuckles pivotally mounted thereon, wheels rotatably attached to said steering knuckles, said axle being pivotally connected to said forward supporting bracket for allowing said axle to oscillate in a vertical plane, means secured to said axle and pivoted to said rear supporting bracket for bracing said axle and permitting it to oscillate, tie rod means for aligning said wheels, and means connecting the aforesaid attaching means for tri-cycle type steering truck on said steering control means of said tractor to one of the aforesaid steering knuckles for steering said tractor.

11. In an attachment as set forth in claim 9, said axle having a central housing and extension axles adjustably secured therein, adjustable tie rod means for aligning said wheels, and adjustable means connecting said vertical bolster shaft on said tractor to one of the aforesaid knuckles for steering said tractor whereby said steering truck attachment may be adjusted to various wheel spacings.

12. In an attachment as set forth in claim 9, means for limiting the amount of oscillating of said axle in a vertical plane.

13. In an attachment for said tractor as set forth in claim 9, said tractor having means for braking said driving wheels, means attached to said connecting means whereby said driving wheels may be braked causing the tractor to make very short turns about either of said driving wheels when steered.

GUSTAF W. ENGSTROM.